United States Patent
Gelibert et al.

(10) Patent No.: US 8,127,479 B2
(45) Date of Patent: Mar. 6, 2012

(54) TIE FOR IDENTIFICATION RING

(75) Inventors: Stephane Gelibert, Sassenage (FR); Jean-Jacques Legat, Colombe (FR)

(73) Assignee: A. Raymond et Cie, Grenoble (FR)

(*) Notice: Subject to any disclaimer, the term of this patent is extended or adjusted under 35 U.S.C. 154(b) by 354 days.

(21) Appl. No.: 12/524,288

(22) PCT Filed: Feb. 7, 2008

(86) PCT No.: PCT/EP2008/000923
§ 371 (c)(1),
(2), (4) Date: Jul. 23, 2009

(87) PCT Pub. No.: WO2008/107054
PCT Pub. Date: Sep. 12, 2008

(65) Prior Publication Data
US 2010/0024174 A1    Feb. 4, 2010

(30) Foreign Application Priority Data
Mar. 7, 2007 (FR) ..................... 07 01658

(51) Int. Cl.
G09F 3/14    (2006.01)
G09F 15/00   (2006.01)
G09F 15/02   (2006.01)
A44C 5/00    (2006.01)
A61B 5/103   (2006.01)
A61B 5/117   (2006.01)
B65D 63/00   (2006.01)
B65D 67/02   (2006.01)
F16L 33/00   (2006.01)

(52) U.S. Cl. ............ 40/665; 40/607.12; 40/607.14; 40/304; 40/633; 40/664; 24/16 PB; 24/17 A; 24/17 B; 24/16 R; 24/17 AP; 24/20 EE; 248/74.3; 292/307 A

(58) Field of Classification Search ............ 40/665, 40/607.12, 607.14, 304, 633, 664; 24/16 PB, 24/17 A, 17 B, 16 R, 17 AP, 20 EE; 248/74.3; 292/307 A
See application file for complete search history.

(56) References Cited

U.S. PATENT DOCUMENTS

| 4,499,680 | A | | 2/1985 | Coburn | |
| 5,191,684 | A | * | 3/1993 | Kenwright | 24/20 R |
| 5,339,496 | A | * | 8/1994 | Oetiker | 24/20 CW |
| 7,204,425 | B2 | * | 4/2007 | Mosher et al. | 235/492 |
| 7,424,769 | B2 | * | 9/2008 | Ogino et al. | 24/20 R |
| 2007/0257113 | A1 | * | 11/2007 | Davis et al. | 235/462.01 |

FOREIGN PATENT DOCUMENTS

| EP | 1495673 A2 | 1/2005 |
| EP | 1611784 A1 | 1/2006 |

* cited by examiner

Primary Examiner — Joanne Silbermann
Assistant Examiner — Syed A Islam
(74) Attorney, Agent, or Firm — Faegre Baker Daniels

(57) ABSTRACT

A tie comprising a strap (1) having two end portions (1A, 1B) respectively provided with a female portion and a male portion of a fastening system is characterized in that the female portion of the fastening system is an opening (2) in the strap that is bordered by a cleavable region (2A-2C) of the strap. Said tie can be used to create an animal identification band whose diameter can be increased without removing the band from the animal.

20 Claims, 1 Drawing Sheet

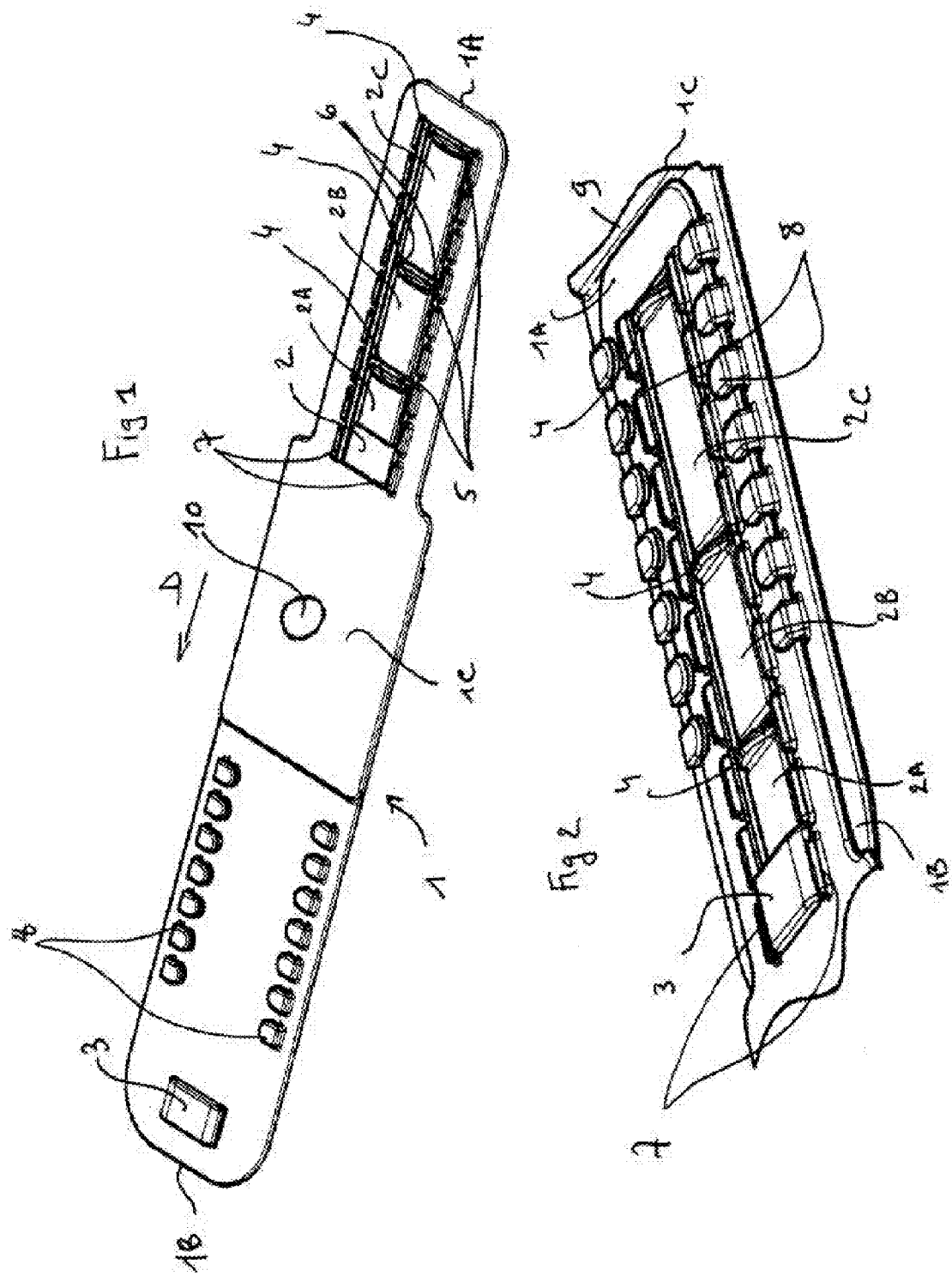

TIE FOR IDENTIFICATION RING

The invention concerns a tie comprising a strap having two end portions respectively provided with a female portion and a male portion of a fastening system.

The male portion inserts in the female portion of the fastening system when the two end portions of the strap are brought together, one on top of the other, to form a ring.

Such a tie can serve, for example, as an identification band intended to be placed on a lower limb (front or back foot, foreleg, etc.) of an animal. Regulations may require that ovine, caprine and other animals be banded at birth, for example for purposes of meat traceability, and virtually permanently, without it being possible to conceal the removal of a ring from and its re-placement on an animal.

If a band is placed on a limb of an animal, it must adapt to the animal's morphology throughout the life of the animal. In addition, the band must be sized so that the animal cannot remove it, but also so that it does not squeeze the animal's limb too tightly. Since this type of band is placed on the animal at birth, its size must vary in order to keep pace with the growth of the animal.

Known from patent document EP-1611784 is an identification band for animals that is similar to the one described above, and is, moreover, designed to be non-removable once it has been placed on the animal. However, the size of this band cannot be adjusted without removing it from the animal.

Also known, from patent document EP-485039, is an identification band for animals similar to the one described above, but whose strap has at least a portion of its circumference that is corrugated, making it expandable. However, this band does not have characteristics that make it possible to prevent removal/re-placement, as indicated above.

The object of the invention is to propose a band made from a tie that remedies the abovementioned disadvantages.

In particular, one object of the invention is to propose an identification band that can be placed on a lower limb of an animal and in particular on the pastern of a sheep or goat at birth.

To this end, the subject matter of the invention is a tie comprising a strap having two end portions respectively provided with a female portion and a male portion of a fastening system, characterized in that the female portion of the fastening system is an opening in the strap that is bordered by a cleavable region of the strap.

This construction of the strap helps make it possible, when the tie is positioned to form a band around a limb of an animal, to increase the diameter of the band, without removing the tie from around the limb of the animal, by detaching the cleavable region of the strap in order to lengthen the opening in the longitudinal direction of the strap.

The invention can have following features:
- the cleavable region is composed of a plurality of cleavable strap modules or portions that can be detached individually from the strap;
- each cleavable strap module or portion is designed to be detached from the strap by peeling;
- each cleavable strap module or portion comprises a boss intended to serve as a gripping point for a pair of pliers in order to effect the peeling;
- each cleavable strap module or portion is adjacent to a slit in the strap that has a cut-out serving as a starting point for the peeling;
- said cleavable strap modules or portions have different dimensions in a longitudinal direction of the strap;
- the opening and each cleavable strap module or portion have a rectangular shape;
- the male portion of the fastening system is an anchor-shaped protuberance;
- the end portion of the strap provided with the female portion of the fastening system comprises two bosses extending parallel to a longitudinal direction of the strap on one and the other side of the opening, said bosses serving to close the residual space between the anchor-shaped protuberance and the opening when the latter elements are inserted one into the other;
- the end portion of the strap provided with the male portion of the fastening system comprises two slots extending parallel to a longitudinal direction of the strap and in which the other end portion of the strap, provided with the female portion of the fastening system, slides;
- each slot is composed of a plurality of studs aligned in said longitudinal direction and having an L-shaped cross section;
- the strap with the fastening system is formed of a single piece made of a plastic material or of metal; [semicolon sic]

The invention also extends to a band intended to be placed on a lower limb of an animal, characterized in that it is made from a tie as defined hereinabove. In this band, the tie can incorporate an identification device, for example an RFID tag. The identification device can be disposed in a central portion of the strap located between the two end portions of the strap, said central portion of the strap optionally being superelevated with respect to the end portion of the strap provided with the male portion of the fastening system.

The construction of the tie according to the invention has the advantage of being simple and relatively intuitive to place in the form of a band on an animal, the locking of the male portion in the female portion of the fastening system being simple to accomplish. In addition, this virtually irreversible lock is protected against potential fraud in a simple manner by the bosses, and this one-piece tie is relatively inexpensive to produce, particularly by the injection molding of a plastic material.

The invention will be still better understood from a reading of the following description, which is illustrated by the drawings.

FIG. 1 is a perspective top view of a schematic exemplary embodiment of a tie according to the invention.

FIG. 2 is a partial perspective top view of the two ends of the tie from FIG. 1 when brought together to form a ring.

In FIG. 1, the tie according to the invention comprises a strap 1 that extends in a given longitudinal direction D between a first end portion 1A, which is provided with a female portion of a fastening system, and a second end portion 1B, which is provided with a male portion of the fastening system, said male portion being configured to insert into the female portion when the two end portions 1A, 1B are brought together, i.e. superposed, to form a ring.

The female portion of the fastening system is, here, an opening 2 in the strap 1, which opening has a rectangular shape and is disposed in the longitudinal axis of the strap at a given distance from the end edge of end portion 1A. The male portion of the fastening system is a mushroom-anchor-shaped protuberance 3, to ensure positive fastening after insertion in the opening 2. Protuberance 3 is disposed near the end edge of end portion 1B.

As can be seen in FIG. 1, mushroom-anchor-shaped protuberance 3 has a head with a rectangular shape that is adjusted to insert with a given tightness into the rectangular shape of opening 2, and a stem (not visible in the figures) whose cross section may also be rectangular and may be adjusted to the height of the opening 2 to cause sliding without excessive play transversely to direction D when said opening is lengthened in modular fashion in direction D as described hereinafter.

According to the invention, the opening 2 in the strap 1 is bordered by a cleavable region of the strap in the form of a plurality of cleavable strap modules or portions 2A, 2B, 2C, each of which here has a rectangular shape, and which succeed one another in direction D from the opening 2 to the end edge of end portion 1A of the strap. The common edge between opening 2 and the cleavable region extends within the strap 1 substantially transversely to direction D.

The term "cleavable strap portion" denotes a portion of the strap that is easily detachable from the strap. In the present case, the detachment of a cleavable portion of the strap is effected by peeling (due to the fact that the strap is made of a rather flexible material), but a break-away cleavable portion could be provided without departing from the scope of the invention if the strap were made of a rather rigid and breakable material.

The strap modules or portions 2A to 2B are designed to be detachable individually from the strap by peeling, and each of them has for this purpose a rounded boss 4 that serves as a gripping point, for a pair of pliers, for example, to effect the peeling.

More particularly, as can be seen in FIGS. 1 and 2, each cleavable strap module or portion 2A, 2B, 2C is adjacent in direction D to a respective slit 5 formed in the strap in the direction transverse to direction D, each slit having at each of its two ends a cut-out 6 (referenced only in the slit 6 [numeral sic] adjacent to module 2B, for reasons of clarity) that serves as a starting point for peeling away the cleavable module or portion. In the exemplary embodiment shown in FIG. 1 or 2, it will be appreciated that the two lateral edges in direction D of each rectangular-shaped cleavable strap module or portion are composed, for example, of a thread (thin film) of the material of the strap, which can readily be torn by peeling but which is also strong enough so that the side of the cleavable module that is common to a side of the opening serves as a support edge for the protuberance 3 when the two ends of the strap are brought together to form a ring.

It can be seen in FIGS. 1 and 2 that the rectangular-shaped cleavable strap modules or portions 2A, 2B, 2C have different lengths in direction D, and in particular have a length that increases by increments, as viewed from opening 2 looking toward the end edge of portion 1A of the strap, making it possible for the increase in the diameter of the band to be adapted to a given rate of growth of the animals to be banded.

These modules 2A to 2C or strap portions that succeed one another in direction D thus are designed to be detached successively in order to lengthen the size of opening 2 in this direction D, thus allowing the protuberance 3 (by being slid in the enlarged opening 2) to be brought toward the end edge of the female portion 1A without being removed from the opening 2. A shape other than the rectangular may, of course, be contemplated for opening 2 and for the cleavable strap modules or portions, for example a triangular, trapezoidal, circular or other shape, without departing from the scope of the invention. Moreover, although three cleavable modules have been depicted in FIGS. 1 and 2, it is obvious that, for example, two or more than three cleavable modules may be provided without departing from the scope of the invention.

End portion 1A of the strap provided with opening 2 further comprises two substantially parallelepipedal bosses 7 (or alternatively two rows of bosses, as shown in FIGS. 1 and 2), which extend parallel to direction D on one and the other side of opening 2 (and of cleavable strap modules or portions 2A to 2C). As appears more clearly in FIG. 2, when protuberance 3 is inserted in opening 2 (portion 1A of the strap being superposed on portion 1B of the strap, causing the head of the protuberance 3 to protrude from the outer side of the band), the lateral edges of the head of protuberance 3 are supported by the lateral edges of opening 2, and the bosses 7 (which project perpendicularly to the plane of the strap 1) close the residual space between the lateral edges of the head of the protuberance and the lateral edges of the opening. This prohibits lateral access by a blade into this residual space and thus reinforces the protection against fraudulent detachment of the fastening system between the two ends of the strap. If such fraudulent detachment were attempted, it can be assumed that the insertion of a blade into this residual space would necessarily leave a visible, and thus readily detectable, scratch on the strap.

To strengthen the solidity of the fastening effect between the two ends 1A and 2A, it is provided that end portion 1B comprises two guide slots 8 that extend parallel to direction D and in which end portion 1A slides when it is superposed on end portion 1B. The end edge of end portion 1A may advantageously have rounded corners to facilitate its insertion in the guide slots 8. As can be seen in FIGS. 1 and 2, each guide slot 8 can be composed of a row of L-shaped studs aligned in direction D and spaced apart according to a symmetrical or asymmetrical arrangement of the studs of one slot with respect to the studs of the other slot along the longitudinal axis of the strap. Thus, FIG. 2 shows portion 1A of the strap inserted in the slots 8 of portion 1B of the strap, with the protective bosses 7 now interposed between the opening 2 and the guide slots 8.

The tie constituted by the strap with the fastening system, the expansion system for expanding opening 2, the protective bosses 7 and the guide slots 8 is made in one piece from plastic material or metal.

The central portion 1C of the strap between the two end portions 1A and 1B can have a rectangular shape and be implemented such that it is superelevated with respect to portion 1B, with the result that when the strap 1 forms a ring, the edge of end portion 1A is, in a way, wedged against an upthrust edge 9 of central portion 1C. This superelevation also helps to reinforce a certain compactness of the two end portions of the strap when one is superposed on the other.

The tie according to the invention has as an application, first, the realization of an animal identification band whose diameter can easily be increased with a simple tool without removing the band from the animal. In this application, an identification device 10 such as an RFID tag can be incorporated into the strap, preferably into the central portion 1C thereof. The RFID tag can be fastened by overmolding, for example, if the strap 1 is made of plastic. Such an RFID tag makes it possible to record all the necessary information for identifying the animal, such as origin, birth date, etc.

The tie according to the invention can also, of course, be placed like a collar around the neck of an animal without departing from the scope of the invention. As a result of its fastening system, it has the advantage of not being easy to remove and thus to lose. In particular, the insertion of end portion 1A in the slots of portion 1B protects the fastening system 2, 3 against the risk of tear-out, for example when the animal rubs against a post or the like.

The invention claimed is:
1. A tie, comprising:
   a strap having two end portions respectively provided with a female portion and a male portion of a fastening system, said female portion of said fastening system including an opening in said strap, said opening bordered by a cleavable region of said strap, and said male portion of said fastening system being an anchor-shaped protuberance; and said female portion of said fastening system further including two bosses extending parallel to a longitudinal direction of said strap and disposed on respective opposite sides of said opening, said bosses closing a residual space between said anchor-shaped protuberance and said opening when said anchor-shaped protuberance is inserted into said opening.

2. The tie of claim 1, wherein said strap is formed of a single piece made of one of a plastic material and a metal.

3. A band for use in placing on a lower limb of an animal, said band including the tie of claim 1.

4. The band of claim 3, wherein said tie incorporates an identification device.

5. The band of claim 4, wherein said identification device is an RFID tag.

6. The band of claim 4, wherein said identification device is disposed in a central portion of said strap located between said two end portions of said strap.

7. The band of claim 6, wherein said central portion of said strap is superelevated with respect to the end portion of said strap provided with said male portion of said fastening system.

8. The tie of claim 1, wherein said cleavable region includes a plurality of cleavable strap modules, said cleavable strap modules individually detachable from said strap.

9. The tie of claim 8, wherein each said cleavable strap module is detachable from said strap by peeling.

10. The tie of claim 9, wherein each said cleavable strap module includes a boss, said boss defining a gripping point for a pair of pliers in order to effect peeling of said module.

11. The tie of claim 9, wherein each said cleavable strap module is disposed adjacent to a slit in said strap, said slit including a cut-out defining a starting point for peeling of said module.

12. The tie of claim 8, wherein said cleavable strap modules have different dimensions in a longitudinal direction of said strap.

13. The tie of claim 8, wherein said opening and each said cleavable strap module each have a rectangular shape.

14. A tie, comprising:
a strap having two end portions respectively provided with a female portion and a male portion of a fastening system, said female portion of said fastening system including an opening in said strap, said opening bordered by a cleavable region of said strap;

said male portion of said fastening system including two slots extending parallel to a longitudinal direction of said strap, said end of said strap provided with said female portion of said fastening system slidably receivable within said slots, each said slot including a plurality of studs aligned in said longitudinal direction, each stud having an L-shaped cross section.

15. The tie of claim 14, wherein said cleavable region includes a plurality of cleavable strap modules, said cleavable strap modules individually detachable from said strap.

16. The tie of claim 15, wherein each said cleavable strap module is detachable from said strap by peeling.

17. The tie of claim 16, wherein each said cleavable strap module includes a boss, said boss defining a gripping point for a pair of pliers in order to effect peeling of said module.

18. The tie of claim 16, wherein each said cleavable strap module is disposed adjacent to a slit in said strap, said slit including a cut-out defining a starting point for peeling of said module.

19. The tie of claim 15, wherein said cleavable strap modules have different dimensions in a longitudinal direction of said strap.

20. The tie of claim 15, wherein said opening and each said cleavable strap module each have a rectangular shape.

* * * * *